United States Patent [19]

Kuhn et al.

[11] Patent Number: 4,746,344
[45] Date of Patent: May 24, 1988

[54] FIBER FORMING BUSHING AND METHOD FOR PROVIDING

[75] Inventors: John J. Kuhn, Gibsonia; Eugene J. Palamara, Butler, both of Pa.

[73] Assignee: PPG Industries, Inc., Pittsburgh, Pa.

[21] Appl. No.: 13,473

[22] Filed: Feb. 2, 1987

[51] Int. Cl.$^4$ .............................................. C03B 37/07
[52] U.S. Cl. ................................................ 65/1; 65/2;
65/12; 65/29; 65/162; 219/494; 219/504;
373/29; 373/40; 373/136
[58] Field of Search ...................... 65/1, 2, 29, 162, 12;
273/29, 40, 136; 219/494, 504

[56] References Cited

U.S. PATENT DOCUMENTS

| | | | |
|---|---|---|---|
| 3,649,231 | 3/1972 | Trethewey | 65/2 |
| 4,285,712 | 8/1981 | Thompson | 65/2 |
| 4,392,879 | 7/1983 | Takeuchi et al. | 65/29 X |
| 4,428,686 | 1/1984 | Brax | 65/29 X |
| 4,546,485 | 10/1985 | Griffiths et al. | 373/28 |
| 4,594,087 | 6/1986 | Kuhn | 65/1 |

Primary Examiner—Robert L. Lindsay
Attorney, Agent, or Firm—John E. Curley

[57] ABSTRACT

A fiber glass bushing having a thermocouple embedded in the bottom thereof and a method of preparing the same is described. The thermocouple is carried in a plate member which is welded to the bushing bottom by a weld on the outside of the busing.

5 Claims, 1 Drawing Sheet

U.S. Patent
May 24, 1988
4,746,344
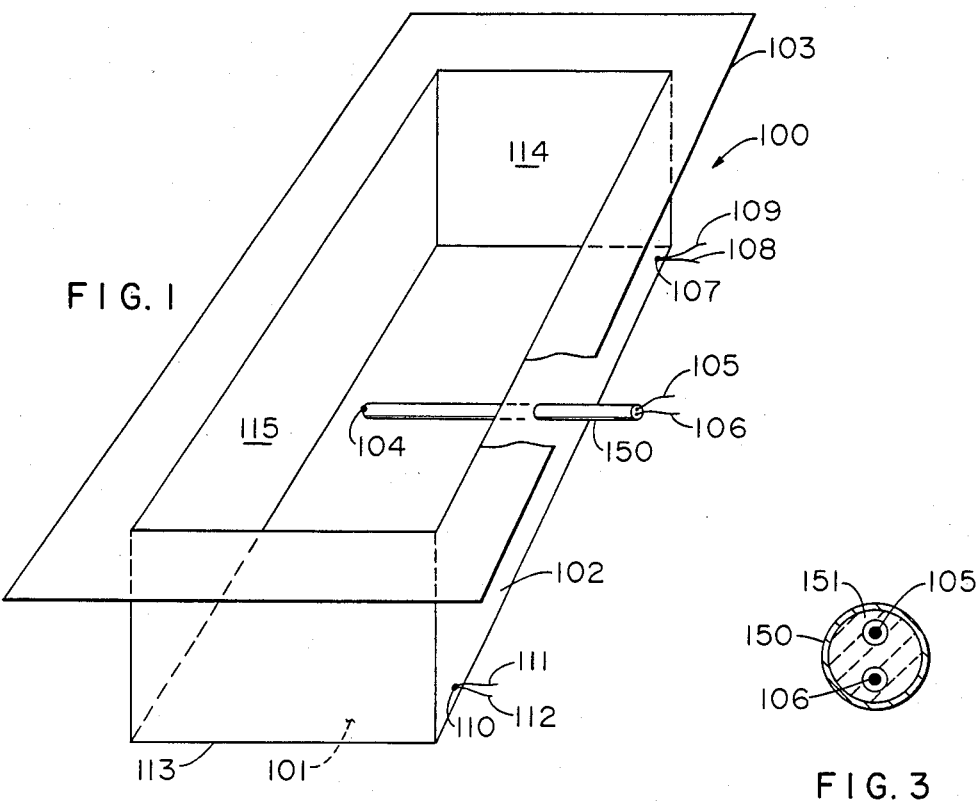
FIG. 1
FIG. 3
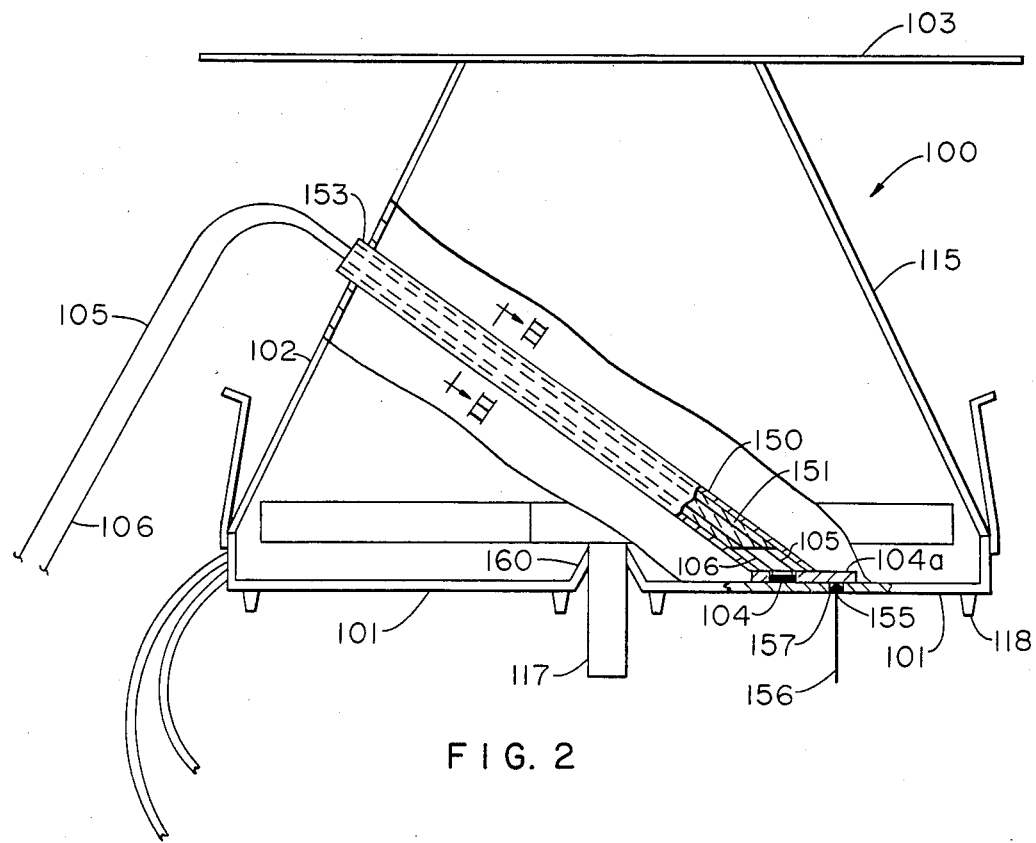
FIG. 2

FIBER FORMING BUSHING AND METHOD FOR PROVIDING

The present invention relates to a fiber forming bushing. More particularly, the present invention relates to a glass fiber forming bushing having a novel electrical measuring system. Still more particularly, the present invention relates to a fiber glass forming bushing and associated thermocouples for use in recording temperatures from the bottom of the bushing.

BACKGROUND OF THE INVENTION

Fiber glass is currently produced from glass fiber bushings which typically are controlled electrically to maintain the temperature of the glass contained in the bushing within a desired range. Maintenance of a desired glass temperature insures uniform viscosity of the molten glass in a bushing and thus uniform filament formation as fibers are drawn from the molten glass as it exits through the bushing orifices, all other conditions being equal. The bushings themselves are precious metal containers typically having 4 sides and a bottom and are generally open at the top. The bushings are provided with a plurality of orifices in the bottom which normally have tips depending therefrom through which the molten glass contained in the bushing flows to form the glass fibers. Bushings are heated by applying current to leads located at each end of the bushing, the leads being connected to the secondary winding of a suitably sized power transformer. The current is increased or decreased by connecting a power pack to the power transformer and altering the output of the power pack by feeding signals to it from a controller that is fed signals from thermocouples attached to the bushing that monitor its operating temperatures continuously.

While the present systems utilized to control bushing temperatures appear adequate in that they do represent the measurements taken from the bushing, they are not actually adequate because they do not necessarily represent the real temperature of the bushing orifice or tip plate. This is so because conventional measurements made do not usually represent true averages of the bushing tip plate temperature. In assignee's copending application Ser. No. 941,236, filed Dec. 12, 1986, a process is described which gives a more accurate measurement of bushing tip plate temperatures. This process requires in part, measurements from the tip plate of the bushing alone or in addition to the normal measurements taken at the bushing sides.

In accomplishing these measurements of the bushing tip plate, it is an important consideration that the thermocouple junction attached to the bottom or tip plate of the bushing be protected and be as flat as possible with respect to the tip plate of the bushing to which it is attached. Molten glass movement in the bushing caused by the molten glass flowing from the forehearth to the bushing and glass currents contained within the bushing itself should not be capable of disturbing the electrical connection of the thermocouple junction and wires with the bushing tip plate. Further, the junction should be able to be welded to the bushing tip plate with a minimum of difficulty.

SUMMARY OF THE INVENTION

In accordance with the instant invention, the applicants have provided a bushing and thermocouple arrangement that is simple in construction, easy to assemble and which provides for accurate and reliable long-term measurements of the bushing tip plate temperature. The bushing and thermocouple arrangement utilized provides for a tubular sheath surrounding the thermocouple wires utilized to make measurements of a bushing tip plate. A plate is provided at one end of the tubular member in which both thermocouple wires and the thermocouple wire junction itself are embedded. An anchoring means is located on the undersurface of the tip plate and adapted to mate with an opening in the bushing bottom. Prior to assembly, the anchoring means which has a rod-like member depending downwardly from it is inserted in an opening in the tip plate of the bushing. This rod is firmly welded to the underside of the plate so that it can be pulled downward with sufficient force to ensure that the plate itself at the end of the sheath lies flat against the bottom of the bushing. The rod is then cut below the opening and the remainder of it is welded into the bushing opening where its mass melts and forms a part of the bushing bottom.

BRIEF DESCRIPTION OF THE DRAWINGS

The present invention will be more readily understood with reference to the accompanying drawing in which FIG. 1 is a diagrammatic, perspective view of one form of bushing utilizing the instant invention.

FIG. 2 is an end view of a split bushing having sloped sidewalls, and partially in section to show the attachment of a thermocouple in accordance with the instant invention.

FIG. 3 is a cross-section of the tube 50 shown in FIG. 3.

DETAILED DESCRIPTION OF THE DRAWINGS

Turning to FIG. 1, there is shown therein a rectangular shaped bushing generally indicated at 100 having sidewalls 102, 113, 115 and 114 and a bottom or tip plate 101. In the drawing of FIG. 1, bottom 101 does not show any orifices for the exit of molten glass, but it will be understood by the skilled artisan that bottom 101 in a production bushing would contain a plurality of orifices typically arranged in rows. Located in the sidewall 102 of the bushing shown are thermocouple junctions 107 and 110. Thermocouple junction 107 is formed from thermocouple wires 108 and 109. Thermocouple junction 110 is formed from thermocouple wires 111 and 112.

Located in the center of the bushing 100 and on the bottom 101 thereof is a thermocouple junction 104 which is formed from thermocouple wires 105 and 106. Thermocouple wires 105 and 106 are contained in a housing 150 which is identical to the tube 150, shown more clearly in FIG. 2, and in a cross-section thereof shown in FIG. 3. As can be seen in the cross-section, housing 150 is a metal chamber in which thermocouple wires 105 and 106 are carried and the thermocouple wires 105 and 106 are surrounded in that chamber by a ceramic electrical insulation, material 151. Typically the ceramic material is a material such as Fiberfrax or a cast ceramic.

The bushing 100 is provided with a bushing flange 103 which is normally utilized in operation to bolt or affix the bushing to a bushing block located above it and through which molten glass flows from a glass fiber forming forehearth to the bushing proper. This flow of molten glass provides a constant supply of molten glass to the bushing so that fibers may be continuously drawn therefrom. In the depiction of FIG. 1, it will be understood by the skilled artisan that walls 113 and 114 are normally provided with electrical connections so that the bushing 100 can be connected to a suitable power supply such as the secondary winding of an AC power transformer for delivering electrical energy to the bushing during its operation thereby providing sufficient heat to the bushing to maintain the glass contained therein in the molten condition.

The bushings described herein as well as the thermocouples and thermocouple tubes are metallic in structure and are constructed of precious metals or precious metal alloys. Typically, the thermocouples are constructed of platinum and rhodium wires which are joined at one end to provide a thermocouple junction. The other ends of the wires are used to provide electronic signals in response to temperatures sensed by the thermocouple junction. The bushing construction materials are typically platinum and platinum-rhodium alloys. Typical alloys are platinum-rhodium alloys comprising 90% platinum and 10% rhodium and more preferably 80% platinum and 20% rhodium. It is within the contemplation of the invention to also utilize grain stabilized precious metals such as zirconia stabilized platinum and platinum-rhodium alloys. In some instances, other precious metals such as ruthenium and palladium may be used.

A bushing similar to that shown in FIG. 1 is shown in an end view in FIG. 2. The major distinction between the bushing shown therein and the bushing of FIG. 1 is that the sidewalls 102 and 115 are sloped from the bottom 101 to the top flange 103 and the bushing is divided lengthwise into two halves. In the bushing depicted in FIG. 2, the tube 150 is shown exiting through opening 153 in wall 102 of the bushing and thermocouple wires 105 and 106 are suitably connected to a control apparatus not shown in the drawing. At the base of the tube 150 is a plate 104a in which the thermocouple junction 104 is embedded. The bushing bottom 101 is provided with a hole 157 into which is inserted a rod member 156 having at its end a weld point 155. The rod 156 is utilized to pull the plate member 104a snugly against the bottom 101 of the bushing during fabrication so that the plate 104a is firmly attached to the bottom prior to welding it in place. Upon welding the plate 104a in place on the bushing bottom utilizing the rod 156, rod 156 is cut below hole 157 and the portion of the rod in the hole 157 is melted to fill the hole 157. That portion of the rod 156 which is melted into the bushing bottom becomes a part of the bushing bottom.

The thermocouple weldment described in and shown in FIG. 2 provides a junction at the bottom of a bushing tip plate in the interior thereof which permits easy access for attachment, protects the thermocouple junction of the thermocouple wires 105 and 106 so that glass does not contaminate the wires or move them in any way during operation and the plate member 104a has completely encased the thermocouple junction 104 thereby providing a method of obtaining a true reading of the bushing bottom without any opportunity for the molten glass contained in the bushing to disturb the thermocouple junction 104 from its attachment to the bottom 101. It will be noted that FIG. 2 depicts a split bushing, i.e., a bushing which contains two separate segments separated by the corrugation 160 shown, the left hand and right hand segments shown each containing rows of bushing tips 118. While only two tips are shown in each segment, the skilled artisan will recognize that the size and number of orifice tips will depend on the product being made and are matters well recognized by the skilled art.

Thus, while the invention has been described with reference to certain illustrative embodiments, it is not intended to be limited thereby except insofar as appears in the accompanying claims.

We claim:

1. A bushing comprising a bottom, sidewalls surrounding the bottom thereby forming a container for molten glass, a plurality of orifices positioned in said bottom and arranged to permit molten glass to flow therethrough to produce a multiplicity of individual molten glass streams from which glass fibers may be formed, a thermocouple assembly including a tube, a pair of thermocouple wires transversing said tube, a plate member affixed to an end of the tube and having the thermocouple wire junction embedded therein, and means for attaching the underside of the said plate member to the bottom of the bushing said means being spaced from said thermocouple wire junction on said plate.

2. The bushing of claim 1, wherein the said tube extends from the bushing bottom through a sidewall thereof.

3. The bushing of claim 1, wherein the said means for attaching said plate is a precious metal weld on the bottom of the plate which is integral with the bushing bottom.

4. A method of providing a thermocouple junction welded to the bottom of a bushing having a bottom and sidewalls on the inside thereof comprising encasing the junction of two thermocouple wires in a metal plate, attaching the plate to the end of a tube through which the thermocouple wires forming the junction pass, welding a rod to the side of the said plate opposite the side that said tube is attached thereto and at a point on the plate spaced from said thermocouple wire junction, providing an aperture in the bottom of the bushing through which said rod may be placed, placing the rod through said aperture and applying pulling forces thereto to snugly pull said plate against the bushing bottom and melting the rod in the aperture to thereby seal the aperture and permanently affix said plate to the bushing bottom.

5. The method of claim 4, wherein the plate, tube, bushing and rod member are constructed of a precious metal or a precious metal alloy.

* * * * *